United States Patent Office 3,430,035
Patented Feb. 25, 1969

3,430,035
MACHINE TOOL CONTROL WITH CUTTER DIAMETER COMPENSATION
Richard E. Read, Cincinnati, Ohio, assignor to The Cincinnati Milling Machine Co., Cincinnati, Ohio, a corporation of Ohio
Filed Jan. 17, 1966, Ser. No. 521,023
U.S. Cl. 235—151.11                6 Claims
Int. Cl. G06f 15/46; G06g 7/66

ABSTRACT OF THE DISCLOSURE

An automatic control apparatus useful for directing a machine tool in the reproduction of a continuous contour path of movement of a tool with respect to a workpiece. The control apparatus includes a portion devoted to the production of corrective factors to be combined with the reference data defining points along the contour, so that the contour can be reproduced with a cutter having a size differing from the nominal size cutter to which the reference data is related. These corrective factors are derived and combined with the reference data prior to interpolation from one point on the contour to the next point. The derivation and combination is performed by a digital computing portion of the control which in addition to the reference data has input thereto a cutter size correction factor and data defining the bisector of the angle formed at this intersection of adjacent spans of the programmed contour. The bisector data is scaled by the correction factor and the scaled data resulting is added directly to the reference data to provide compensated reference data to the contour generating portion of the control apparatus.

---

It is an object of this invention to provide a cutter diameter compensation system by which no position error is generated in the path of movement of the cutter.

Another object of this invention is the provision of a cutter diameter compensation system which generates a new path of movement that is parallel to the originally programmed path and which generates no discontinuities that are more severe than those found in the original.

Further it is an object of this invention to provide an interpolating control system with cutter compensation in which no feed rate errors are introduced.

It is also an object of this invention to provide an instantaneous cutter position correction system which can be turned on and off during operation without producing discontinuities in either the resultant cutter path or the rate of movement thereof.

An additional objective of this invention is the provision of a cutter diameter compensation system that is adapted for controlling a process in either two or three dimensions while using the same principles and similar equipment.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The control system of this invention in its preferred form includes as an essential element means for providing the resultant vector bisector of the angles included between normals erected from end points, the lengths of the bisectors being determined by the intersections of lines parallel to the programmed spans and at a fixed distance from the programmed spans, which distance for simplicity is a unit distance. The direction of the vector may, for simplicity, be away from the work surface. The control also includes means for providing a cutter off-set factor which factor is used as a scalar multiplier to produce vectors that are the product of the cutter off-set and the vector bisectors of the respective end points. Each of these product vectors then locates an end point on the off-set path of the cutter. These new end points are input to an interpolator which provides a series of closely spaced points intermediate to these end points. The rate of generation of these intermediate points is dependent upon two factors, one a programmed rate and the other a factor dependent on the distance between end points, that is the span lengths input to the interpolators. The rate is directly proportional to the first mentioned and inversely proportional to the other so as to produce a generation of these points at a rate to cause a constant velocity of travel of the cutter along its path of movement. Since the spans input to the interpolator in the present system have been altered by the components resulting from the cutter diameter compensation, the actual velocity of the cutter along its path will remain at a constant rate regardless of the amount of cutter diameter compensation.

A clear understanding of the present invention can be obtained from the following detailed description in which reference is made to the attached drawings wherein.

Figure 1:
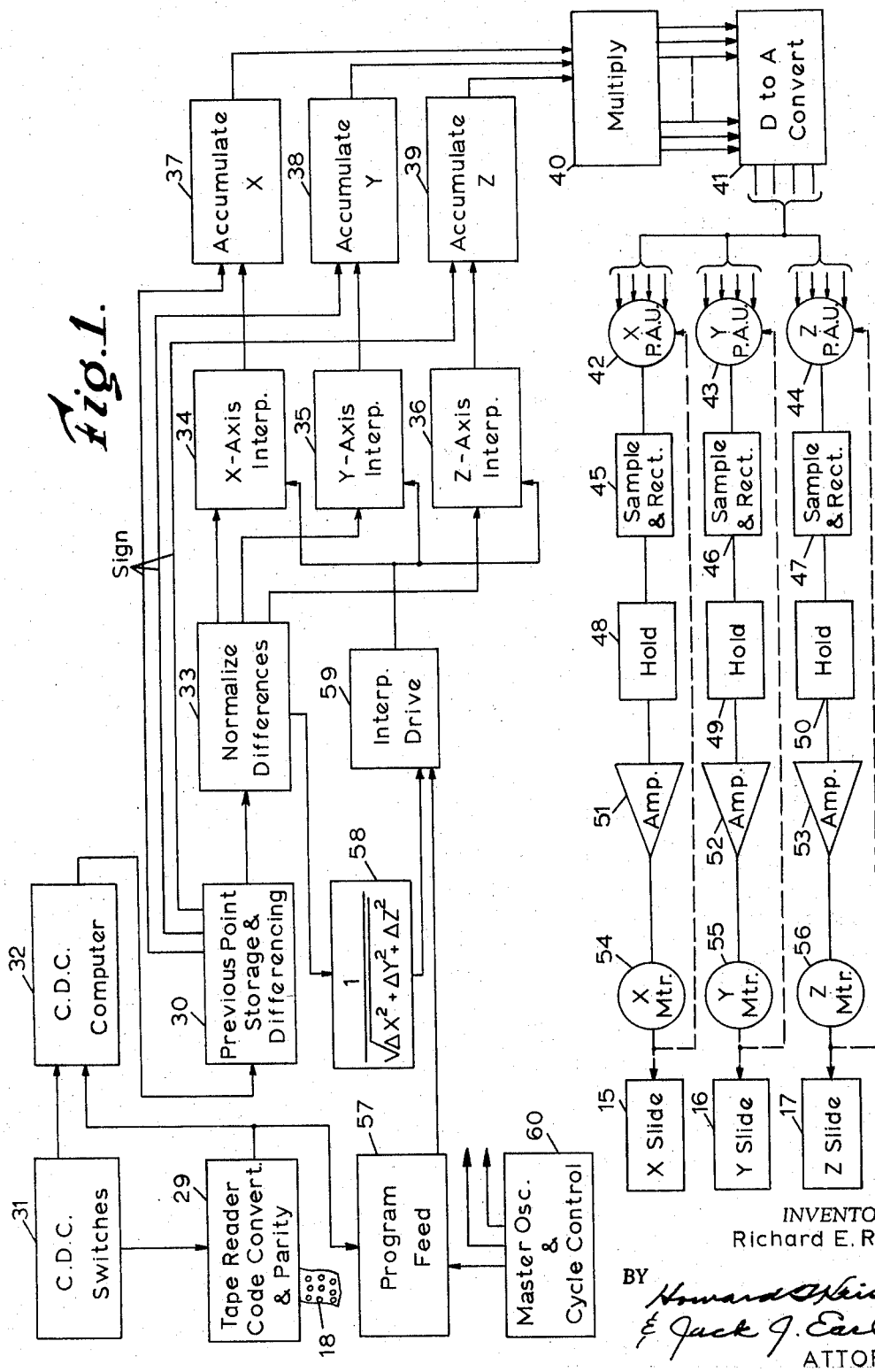
FIG. 1 is an information flow block diagram of a three axis control system which includes the cutter diameter compensation of this invention.

A control system provided with the cutter compensation apparatus is shown in its general form by a block diagram of FIG. 1. This control system, without cutter diameter compensation, is shown in more detail in copending U.S. patent application Ser. No. 498,488, assigned to the assignee of the present application. It is the purpose of the control system to cause simultaneous movement of a set of slides 15, 16 and 17 to effect a relative movement that closely approximates movement of a point in space along a predetermined path. A well known use of such coordinated movement is in an automatic milling machine under what is commonly termed "numerical control" to reproduce complex contours on a workpiece. The slides 15, 16 and 17 are identified by their directions of movement, the directions being defined as the X-axis, Y-axis and Z-axis, respectively, in a three axis system of control. The apparatus utilizes data that is recorded in information blocks along a punched tape 18. The tape 18 is conventional eight channel punched tape using a word address scheme of recording and in which each block of information may include three dimensions in binary coded decimal form, each dimension being preceded by an axis address to define its direction and to associate it with one of the slides 15, 16 and 17. The tape 18 also includes a set of cutter diameter compensation factors that are also recorded in binary coded decimal form thereon. Each of these compensation factors is preceded by a P, Q or an R address symbol. These P, Q and R addresses are used to associate amounts of cutter size compensation with each of the number words immediately following the X, Y and Z-axis directions, respectively. The tape 18 can also have certain auxiliary functions recorded in each information block to cause various on-off mechanisms to respond, but these will not be described herein since the use of these auxiliary functions are not involved in this invention. Also, a programmed feed rate value can be included in the information block. Each complete block of information is ended by an end of block symbol to separate and identify the blocks on the tape 18.

Figure 2:
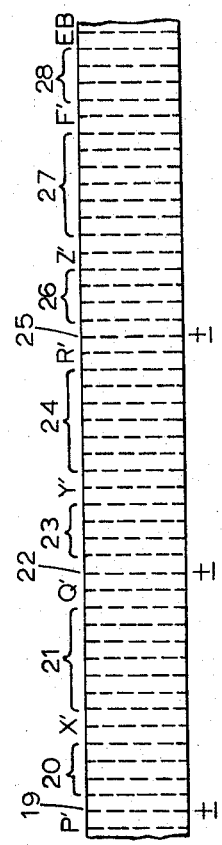
FIG. 2 is a showing of a portion of a programmed tape illustrating the format used with the apparatus of the present invention.

There is shown in FIG. 2 a section of the tape 18 which includes a complete block of information. The lines of information are represented on the tape 18 by dashed lines for simplicity. The first portion of information that is included on the tape in the block shown is the P address line P′ and this is followed by a sign line 19 indicating whether the following numeric information is positive or negative. The sign line 19 is followed by a group of four lines 20 of information on the tape which are the four digits of a cutter diameter factor. This factor will be explained in detail later herein. The factor 20 is followed by an axis address line X′ and the next seven lines 21 of the tape are the digits an X-axis dimension. Following the X-axis dimension 21 is an address line Q′ and following this is another sign line 22. The sign line 22 indicates the sign of the Y-axis cutter compensation factor which is included in the group of tape lines 23. The Y-axis information, preceded by the address line Y′, immediately follows on the tape and is included in the group of lines 24. In a similar fashion the next line R′ is the Z-axis cutter compensation factor address followed by its sign line 25 and this sign line is then followed by the numeric information in the group of lines 26. The final position information is introduced by the axis address line Z′ and the Z-axis dimension is included in the group of lines 27. The final information in the block of tape 18 is the feed rate information lines 28 which are preceded by an address line F′. This number represents the numeric value of the feed rate as programmed. The end of the block of tape is identified by the line EB which is the final line of information in the block shown.

The tape 18 is read by a reader circuit 29 which includes a code conversion unit that changes the respective binary coded decimal dimensions and feed rate numbers as well as the cutter diameter factors into a pure binary number word form and these binary number word forms issue from the reader and code converter circuit 29 serially, least significant bit first. The reader circuit 29 also includes a partity checking circuit of conventional form which examines the punched data on the tape 18 and compares it against certain standards to determine its validity. If the data is determined to be invalid a signal is produced to interrupt the control and stop the machine. Parity checking circuits are well known in the art and further description herein will not be undertaken.

The cutter compensation in the present control operates to alter the dimensional words that are shifted out of the reader circuit 29 before they are shifted into a differencing circuit 30. These dimension number words shifted into the differencer 30 in each instance represent the sum or the difference between a programmed point from the tape and a correction factor to produce dimensions on a path of movement that is corrected for a cutter size of other than the nominal size for which the program on the tape was prepared. The cutter offset control includes a set of manually positioned switches 31 which are operable to produce a signal output in binary coded decimal form representing the digits of a preset dimension that is the difference between radius of the nomial cutter and the actual radius of the cutter to be used. These switches are sampled in the same manner as the reader outputs are sampled and the binary coded decimal representation thus obtained is applied to the code converter portion of the reader circuit 29 which outputs a pure binary number word equivalent to the setting of the switches 31. The cutter radius difference is then transmitted to the cutter compensation computer circuit 32 where it is multiplied successively with each of the programmed compensation factors 20, 23, 26 in the directions of the three axes to produce three products that represent the corrections to be combined with each of the three new position number words 21, 24, 27 from the tape 18. The computer circuit 32 also operates to combine these corrections with the dimension number words 21, 24, 27 and the results are then transmitted to the differencing circuit 30. The combining that occurs at the computer circuit 32 is an algebraic summing according to whether the actual cutter radius is greater or less than the nominal size and according to the signs 19, 22 and 25. The switches of the unit 31 include a switch that is set in one or the other of two positions representing under-size and over-size, the latter being defined as the condition where the cutter used is larger than the cutter specified by the program. This over or under-size switch operates along with the sign lines 19, 22, 25 to preset the algebraic summing circuit in the computer 32 to add or to subtract the compensation product as will be seen. Therefore, the new dimension number words that are inserted into the differencing circuit 30 are corrected for the actual cutter size and the correction can be either in the positive or negative sense.

The binary dimension number words from the cutter compensation computer 32 are input to the circuit 30 which includes register storage for the previous point dimensions that have been input to it. The first dimension of a newly read block, corrected for cutter size difference, is compared against the next previous corresponding dimension. For example, the newly read and corrected X-axis dimension is compared against the previously read and corrected X-axis dimension. Both of these X-axis dimensions have been passed through the cutter compensation circuits described and thus are each corrected for the actual cutter diameter to be used. A set of difference signals in the directions of three axes is generated, also a binary number word form, if differences exist. These difference number words are tested to determine their direction along the respective axes of movement from the previous points and a sign, minus or plus, is assigned to each in accordance with its direction toward or away from the origin of the axes. The difference number word is serially shifted out of the differencing circuit 30 to the next circuit unit 33. Also, the newly read dimension as corrected for cutter compensation is stored in the differencing circuit 30 to be used as the previous point when the next block of information is read from the tape 18.

The three compensation factors 20, 23, 26 and their interlaced dimensions 21, 24, 27 are serially read from the tape 18 and a difference is formed for each control dimension as described. Each of these three differences is shifted to an appropriate register circuit in the next circuit unit 33 which stores the differences first in the form as they issue from the differencing circuit 30 and then after all have been issued, the circuit 33 functions to convert these three difference dimensions simultaneously to a normalized form and each of these is then stored for subsequent use. The normalizing of the difference numbers eliminates the leading "0's" in the most significant bits until the largest number has a "1" in its most significant bit place. Binary numbers are considered in their conventional form having only "0" and "1" symbols. This normalizing is in effect a simultaneous and successive multiplication of the difference number words by their radix two until the most significant "0" in the largest difference number word disappears. The normalizing of the difference numbers changes their modulus. As described in the cited copending application, the modulus of a number is the number of finite states that the significant bits of the binary number word can represent. The trailing zeroes, those in the least significant places before normalizing, are not considered as significant.

The normalized difference numbers are then dumped simultaneously into the next circuit blocks 34, 35 and 36, respectively, which perform simultaneously an interpolation for each difference dimension. In performing the interpolation each of the circuits 34, 35, 36, respectively, adds its respective normalized difference number the modulus number of times. As these iterative additions proceed, the sum exceeds the modulus and the excessive bit signals occur as carry or overflow signals which are transmitted to a respective accumulator circuit 37, 38, 39 where they are algebraically combined with the previous accumulation and therefore they continuously generate a dynamic number that proceeds is absolute value from the point previously read from the tape 18 and corrected for cutter compensation to the next succeeding point, that is, from one to the other of the two points from which the difference number word was obtained in the differencing circuit 33. The respective sign signals from the differencing circuit 30 are connected to the accumulator circuits 37, 38, 39 to set these circuits to add or subtract the overflows to or from the previous accumulation, respectively, in accordance with the direction of the difference over which the interpolation is proceeding.

Certain digits of the accumulated numbers, stored in the accumulators 37, 38, 39 in binary form, are periodically and cyclically connected to a multiplier circuit 40 which multiplies these sampled portions by a fixed factor to make the sampled portion of the accumulated member cyclic over a fixed range compatible with the modulus of the feedback devices. The number of bits or digit places of the accumulators 37, 38, 39 to be sampled is fixed and therefore the value of the sampled accumulation cycles periodically. For example, the accumulators may be sampled only at their ten bits of least significance and in a binary system this means that the number sampled will be cyclic over each 1024 overflows. If each bit is weighted at 0.0002 inch per bit, the corresponding travel of a slide is 0.2048 inch. Hardware for the fine control in the analog system is most conveniently obtained for use in a system that is cyclic over 0.200 inch. Therefore a fixed multiplier value of 1.024 is used in the multiplier circuit 40 to render the ten bits sampled cyclic over 0.200 inch.

The output of the multiplier circuit 40 is connected to a digit-to-analog converting circuit 41 which converts the binary information to a voltage analog signal that is impressed on an alternating signal carrier. This signal is connected to energize the quadrature stator windings in each of a set of resolver type position analog units 42, 43, 44 of the three axis servo loops. It should be pointed out that the position analog units are multispeed systems that provide an unambiguous control over the full range of movements of the respective slides. The system is for continuous or contour type control and the lag of the instantaneous slide position behind the input command signal is normally much less than the cyclic portion of the finest or most accurate of position analog signals. Therefore, in normal operation after alignment, only the fine range portion is used and in the specific case this is the 0.200 inch range resolver to which reference has previously been made. Each of the output accumulators does, however, maintain an absolute value over the full range which is connectable to the multispeed position analog units 42, 43, 44 in an alignment mode of the machine.

A set of sampling and rectifying circuits 45, 46 and 47 is provided and each of these is connected to the output of its corresponding position analog unit 42, 43, 44. These sampling circuits are operated periodically and cyclically in time with the connection of the output accumulators 37, 38, 39 to the multiplier circuit 40 to connect the alternating signal from the position analog units 42, 43, 44 to direct current voltage level holding circuits 48, 49, 50, respectively. The holding circuits 48, 49, 50 store the sampled and rectified voltage levels from one sampling period to the next. Each of the holding circuits 48, 49, 50 is connected to furnish its stored voltage level signal to a power amplifier 51, 52, 53, respectively, and these amplifiers provide the input drive to motors 54, 55, 56. The motors 54, 55, 56 can, for example, be hydraulic motors and it is understood that the motors in FIG. 1 include the conventional electro-hydraulic transducers which cause operation of the motors to drive the respective slides 15, 16, 17 to which they are mechanically connected. The motors 54, 55, 56 are also mechanically linked to the position analog units 42, 43, 44 to close the respective servo loops and the amplified signals from the amplifiers 51, 52, 53 are supplied to the motors 54, 55, 56 in such a manner as to cause the position analog units 42, 43, 44 to be driven in a direction tending to reduce the error signals stored in the hold circuits 48, 49, 50.

The rate of operation of each of the motors 54, 55, 56 is dependent upon the amplitude of the error signal as supplied to its respective hold circuit 48, 49, 50. This amplitude is directly proportional to the dimension word change in the particular one of the accumulators 37, 38, 39 to which it is connected in the interval between successive sampling periods. This change in the dimension word is in turn directly proportional to the rate of accumulation of overflow signals, or more specifically, to the iterative add rate at which the interpolators 34, 35, 36 are operated. Therefore by controlling the rate of interpolation, the rate of movement of the slides 15, 16, 17 and the corresponding rate of generation of the predetermined path in space is controlled.

As previously mentioned, the blocks of information on the tape 18 can include a programmed feed rate. This feed rate is converted in the reader circuitry to a binary number word which is conveyed to a programmed feed rate control circuit 57 and this circuit produces a series of output gates that are directly proportional to the programmed feed rate. The circuit 57 also includes provision for an override control of the feed rate that proportionally reduces the programmed feed rate. The feed rate control is of the actual or resultant movement of the point through space and therefore a computer circuit 58 is provided wherein a train of gate pulses is produced, the frequency of which varies in accordance with the reciprocal of an approximation of the vector sum of the span lengths of the respective coordinate directions over which interpolation is performed. That is, the pulse train from the circuit 58 is inversely proportional to the square root of the sum of the squared span lengths represented by the separate difference numbers. It will be recalled that these difference numbers are produced after cutter compensation is accomplished by correcting the input position data. Since they are produced from corrected data, the feed rate will reflect the span length after the cutter compensation. Therefore no error will be introduced in the feed rate control as a result of a difference between the actual length of path and the programmed path due to a cutter size correction. The two trains of gate pulses from the circuits 57 and 58 are connected to an interpolator drive circuit 59 from which discrete blocks of pulses issue at a rate of repetition that is a function of the two gate pulse trains. Each discrete block of interpolator drive pulses produces one serial addition in each of the interpolators 34, 35, 36.

The block diagram of FIG. 1 also includes a master oscillator and cycle control circuit 60 by which the elements throughout the entire control apparatus are driven and maintained in properly timed relationship with each other. The timing circuit is comprised of the oscillator, two ring shift registers and a decoding matrix like that of the above-mentioned copending application. The decoding matrix combines the outputs of predetermined stages of the cycling shift registers to produce gate control signals to operate various gating in the control so that the proper timing is maintained throughout.

Figure 3:
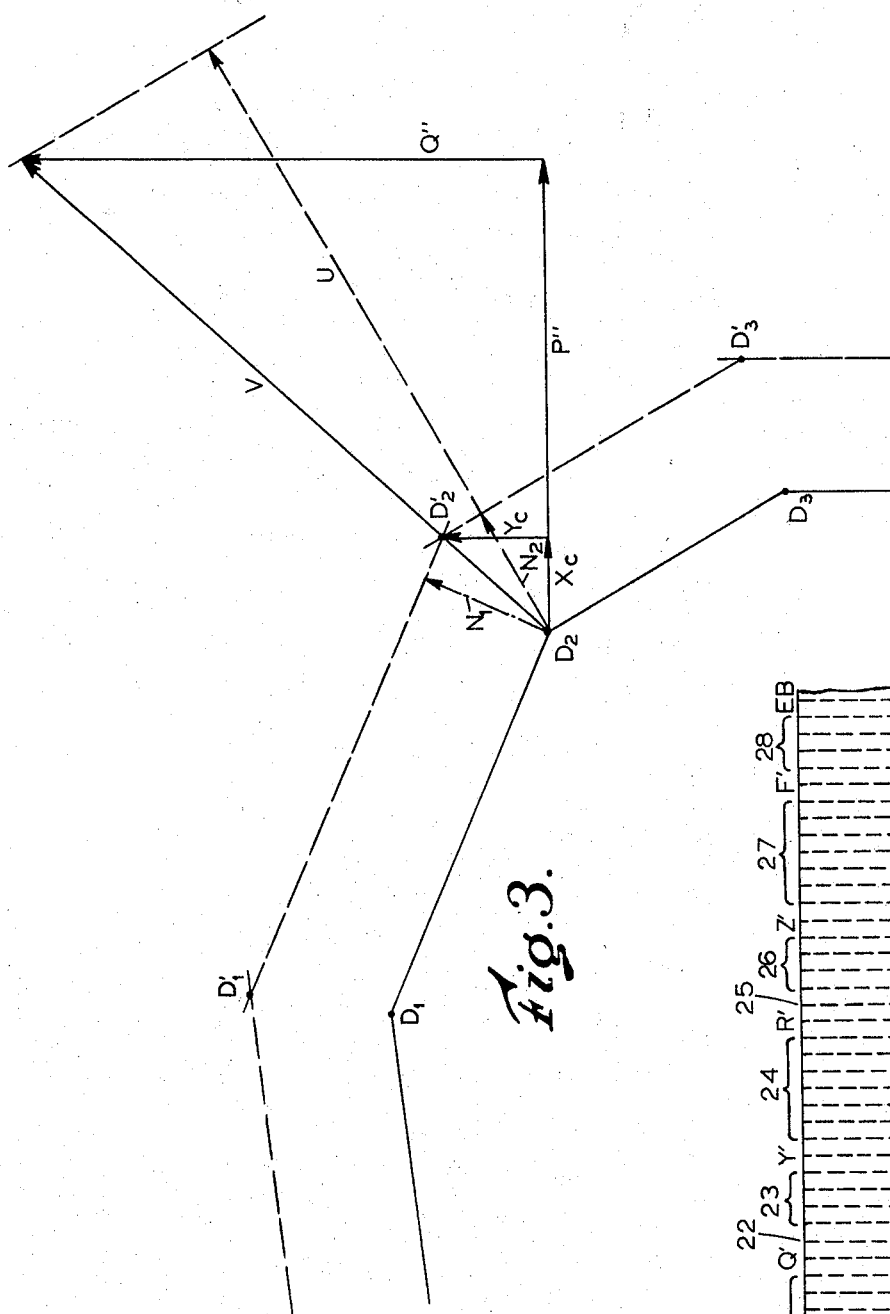
FIG. 3 is a diagrammatic showing of the principles of cutter compensation employed by this invention.

The philosophy of cutter diameter compensation as embodied herein can best be explained with reference to FIG. 3 which is a diagrammatic showing of compensation for two axes only of control. The programmed path for the center of a cutter of a predetermined diameter is shown as the solid line connecting the spaced points D1, D2, D3 which are the points defined by the two axis data such as with respect to X and Y-axis directions. The desired path of the center of a cutter of greater than the predetermined diameter is shown as the dashed line connecting the points D1', D2' and D3' which are the points for which X and Y-axis data must be generated to produce a corrected path description. The amount of cutter offset is shown by the normals N1 and N2 between the programmed path and the desired path. The workpiece in the diagram is located inside the curve of the programmed path of movement, that is on the side of the path D1, D2, D3 opposite the new path D1', D2', D3'. It has been discovered that the straight lines connecting the points D1, D2, D3, with the new points D1', D2', D3' are the bisectors of the angles included between the normals such as N1, N2 from each programmed point D1, D2, D3 to the desired path segments on either side of the new points D1', D2', D3'. This is illustrated in the diagram at point D2 where the straight line V extends from the point D2 through the desired point D2' and bisects the angle between the normals N1 and N2. This bisecting relationship holds true in each case whether for an inside curve or an outside curve wherein the curves are defined by points of straight lines segments approximating the smooth curve. The blocks of information on the tape 18 in a two axis system each contain an address symbol P' followed by a four digit binary code decimal number and a symbol Q' followed by a four digital decimal number which numbers comprise the respective coordinate lengths of the resolved vector components, P" and Q" in FIG. 3 for the vector line V. This is the same tape information as was described with reference to FIG. 2 of the present disclosure but in the two axis control the Z-axis information 27 and the address line R' and correction factor 26 are omitted. The vector bisector V is defined in two respects. The first, its angle, is determined by the location of the point D2 and the orientation of the normals N1, N2 which are computable from the programmed path D1–D2–D3. The length of the vector V is defined as its length to a path parallel to and spaced at a unity distance U from the programmed path portion D2–D3 and this also is computable. The same length of the vector V would result if the diagram were made with respect to the programmed path portion D1–D2. The length of the vector V is always greater than unity. In the two axis coordinate system of reference, a length of the vector V can be defined by the coordinate dimensions of the lines P" and Q", in FIG. 3. When these are multiplied by the scaler value of the normal N2, the correction dimensions $X_c$ and $Y_c$ are obtained to define the vector length of the straight line from the programmed point D2 to the new point D2' and these dimensional lengths can be added directly to the coordinate dimensions of the point D2 to form the coordinate dimensions of the point D2'. The cordinate dimension of lines P" and Q" are readily obtained from the vector V during the tape preparation which commonly is done by computing machines. These machines, after computing the points D1, D2, D3 along a predetermined path, have all the information that is required to solve for the dimensions P", Q". No unique or extra information is required during tape preparation and the post processor in the computer routine therefore can be used to generate the values of P" and Q" for the tape 18. This is also true in a three axis system where the computer knows the contour of the work part and therefore in the post processing routine it can also be used to solve for the value of the number word following the address line R'. The scaler factor represented by the normal N2 is the amount of cutter size compensation and this is provided by the machine operator when he dials in the amount of deviation of the cutter to be used from the size of the normal cutter for which the tape 18 was prepared. The direction away from the part contour is assigned as the positive direction and a correction for an oversize cutter is defined as a positive correction. In this manner the direction of the vector V is assigned and a new path is computed on the correct side of the programmed path by the circuitry within the machine control.

Since the computer which generates the value of the corrections P" and Q" in the post processing routine knows the part contour when these corrections are determined, a correction factor for a third axis can just as easily be made for a three axis control program making this system equally compatible for a three axis cutter compensation system. The third axis or Z-axis compensation factor could be preceded by a letter address, as in the example of FIG. 2 R', and also would be followed by the four digit binary coded decimal number word 26 as in the case of the X and Y-axis correction factors 20, 23 and identified by the addresses P' and Q'. The four digit correction number is used herein for illustration only, it being recognized that this is arbitrary and imposes some limitations on the control. For example, the maximum length of vector V which can be defined by the four digit coordinate dimensions following the addresses P', Q' and R' in a three axis control system limits the sharpness of a corner that can be routinely negotiated under cutter compensation.

Figure 4:
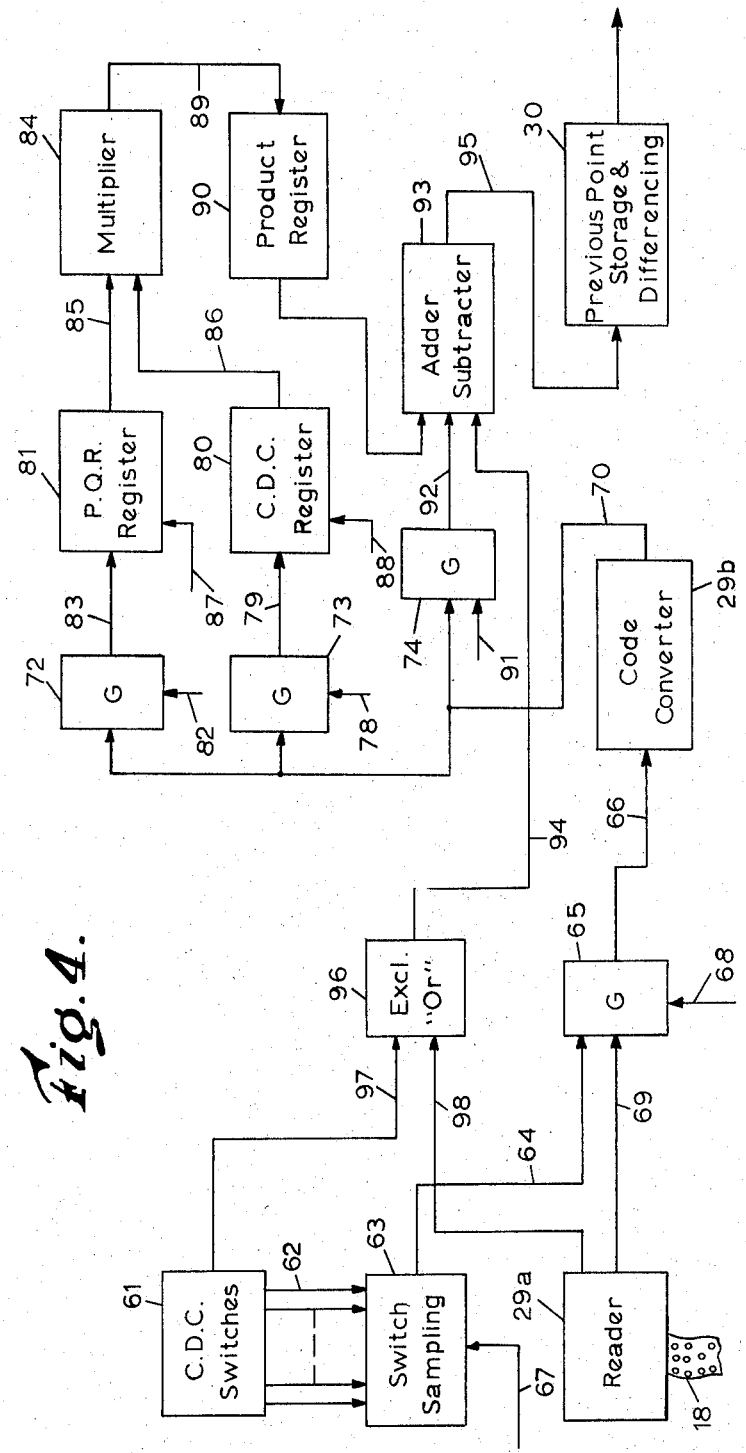
FIG. 4 is a more detailed information flow block diagram of a portion of the system of FIG. 1 showing the cutter off-set circuit manipulators.

The information flow block diagram for the computing portion of the control of FIG. 1 is shown in more detail in FIG. 4. The cutter diameter compensation switches 61 comprise a set of manually operated switches having decimal positions marked thereon for a range of cutter size differences. These switches provide output signals on the parallel connecting lines 62 that translate the switch settings to binary coded decimal information and the output is related to radial size since the actual path will be off-set an amount equal to radial difference. These switches are included in the circuit unit 31 of FIG. 1. Each switch then functions as a decimal to binary coded decimal converter and each switch outputs information that appears in the same form as the lines of information on the tape 18. A switch sampling circuit 63, also included in the circuit unit 31 of FIG. 1, is operated to sequentially connect the cutter size compensation information to an input cable 64 that connects with a gate circuit 65. The gate 65 is opened to connect the cable 64 to a cable 66 when sampling pulses are applied to the sampling circuit 63. The circuit 63 is driven by sampling control pulses connected over a line 67 from the cycle control circuit 60 and during the same time a control signal is applied to the gate 65 over a line 68. The gate 65 also functions during a tape reading cycle to connect the output of the reader 29a on to a signal cable 69 that carries it to the converter input cable 66 and the gate 65 operates at this time to disconnect the cable 64 from the cable 66. The code converter 29b operates as in the previously cited copending application to convert the binary coded decimal information input to it over the cable 65 into a pure binary form which is output serially onto a line 70, least significant bit first.

The output line 70 connects with each of three gate circuits 72, 73, 74 and at predetermined times during the tape reading and cutter compensation computation, each of these is opened by a control signal on one of the lines 78, 82, 91 from the cycle control circuitry 60 to pass the binary number word output from the converter circuit 29b to an appropriate circuit. The gate 73 is opened by a control signal on an input control line 78 from the cycle control unit 60 at the time interval during which the binary number word on the line 70 is converted from the offset dimension originating at the switches 61. The binary number word is passed through the gate to a line 79 that connects with a register 80 in which the cutter compensation value is stored. The numerical values 20, 23, 26 from the tape 18 are each stored in a register 81 after they are read and converted. Therefore whenever one of these emerges from the converter 29b on the line 70, the gate 72 will be opened by a control signal on the line 82 and the binary signal from the line 70 will be applied to an input line 83 that transmits it to the register 81. The contents of the two registers 81 and 80 are shifted simultaneously into a multiplier 84 over lines 85, 86 by the connection of trains of shift pulses that are applied in step to the register drive lines 87, 88. These pulses originate also at the cycle control circuitry 60. The multiplier 84 produces a product from whichever of the values of 20, 23, or 26 is in the register 81 and the radius values stored in the register 80. This product is output over a line 89 that carries it to a register 90 where it is stored until its respective axis dimension X, Y or Z is output from the converter 29b on line 70. Each product in the register 90 is with respect to a particular axis and the next dimension word from the tape 18 is with respect to the same axis due to the interlaced recording as described with respect to FIG. 2. The gate 74 is then opened by a control signal on the line 91 and the next axis dimension word is serially input on a line 92 as one of two inputs to a serial adder or subtractor circuit 93. Since each product in the register 90 is obtained immediately before the respective one of the dimensions 21, 24, 27 with which it will be combined is read, the programmed path number words can be shifted directly out of of the converter 29b without intermediate storage and are combined directly with the product. The adder-subtractor circuit 93 is set to either add or to subtract the product in the register 90 from the binary number word passed through the gate 74 in accordance with the signal level on a control line 94. This control line 94 is the output line from an exclusive "or" circuit 95. The circuit 95 outputs an add level signal whenever both of its input lines 96, 97 are at the same signal level, that is, either both indicating positive numbers or both indicating negative numbers in the switch circuit 61 and the reader 29a at the time when one of the compensation factors following the address lines P', Q', R' is read. If the lines 96, 97 are oppositely signed, that is at different levels, the output on the line 94 is at a signal level to cause the circuit 93 to subtract the product in the register 90 from the number words shifted through the gate 74. The sum or the difference from the circuit 93 is shifted serially out on an input line 98 which transmits the number word to the differencing circuit 30. This circuit and the succeeding ones function as previously described herein and as described in detail in the aforementioned patent application to continuously generate points lying on a straight line between two end points. The end points in this case have, however, been altered by the cutter size compensation circuitry to be on a path that is offset from the programmed path recorded on the tape 18 by an amount equal to the difference in cutter radius corresponding to the offset that has been dialed into the switches 61.

This same cutter off-set compensation can be used to correct for cutter deflection during a cut so that an accurately sized workpiece will result. If a cutter deflection is sensed in terms of strain of the cutter and a proportional signal is produced, this signal can be applied in place of the cutter size difference information from the switches 61. The result of the off-set computations using this substitute signal will be path corrected to compensate for the deflection of the cutter. These deflection measurements could be made with a strain gauge and commutator and the magnitude of the strain signal would be analogous to the dimensional magnitude which is represented by the signal output from the switches 61. Thus in the broad sense, the principle of the system described can provide off-set correction either for cutter size or for cutter deflection.

What is claimed is:

1. In an automatic control apparatus, the combination comprising:
   (a) means for providing sets of signals defining a series of data points along a predetermined path formed by programmed and intersecting segments, said data points occurring at the intersections of the programmed segments,
   (b) means for providing sets of signals defining a unit vector at each of said data points, each of said unit vectors being from a respective one of said data points and extending to the intersection of two segments parallel to the programmed segments intersecting at that respective data point and spaced from said programmed segments at a unit distance,
   (c) means for providing an off-set signal representing a perpendicular distance from said programmed segments, and
   (d) means for scaling each of said sets of unit vector signals with said off-set signal whereby the result of said scaling is a series of signal outputs defining vectors from each of said data points to the intersections of segments parallel to said programmed segments and spaced therefrom by said perpendicular distance.

2. In an automatic control apparatus, the combination comprising:
   (a) means for supplying coordinate dimensions of terminal points formed by the intersections of a plurality of straight line segments defining a predetermined path and correction factors for each of said terminal points including lengths in the coodinate directions of a vector therefrom to an intersection of stright line segments parallel to the segments on each side of the respective terminal points and spaced therefrom at a unit distance,
   (b) means for selecting a perpendicular distance from said straight line segments of the predetermined path,
   (c) means for scaling said vector coordinate lengths by a ratio of the selected perpendicular distance to said unit distance, and
   (d) means for algebraically summing the respective coordinate dimensions of said terminal points and the scaled vector coordinate lengths to define the coordinate dimensions of points of intersection of segments of a path parallel to said predetermined path and spaced therefrom at said selected perpendicular distance.

3. In an automatic machine tool control apparatus adapted to move a cutting tool with respect to a plurality of coordinate axes, the combination comprising:
   (a) means for supplying dimensions along the plurality of axes of terminal points formed by the intersections of a plurality of programmed segments defining a predetermined path of the center of the cutting tool and correction factors including projected lengths along the plurality of axes of a vector from each of said terminal points to an intersection of segments parallel to the programmed segments of each side of each respective terminal point and spaced therefrom at a unit distance,
   (b) means for providing a cutter center off-set value,
   (c) means for scaling the projected lengths of said correction factors for each of said terminal points by a ratio of the selected cutter center off-set value to said unit distance, and
   (d) means for algebraically summing the respective coordinate dimensions of said terminal points and the scaled projected lengths of the correction factors to define with respect to said axes points of intersection of segments of a path parallel to said predetermined path and spaced therefrom at said cutter center off-set value.

4. In an automatic machine tool control apparatus adapted to move a cutting tool with respect to a plurality of coordinate axes, the combination comprising:
   (a) means for supplying dimensions along the plurality of axes of terminal points formed by the intersections of a plurality of segments defining a predetermined path of the center of the cutting tool and correction factors including projected length values along the plurality of axes of a vector from each of said terminal points to an intersection of segments parallel to the predetermined path segments on each side of each respective terminal point and spaced therefrom at a unit distance, (b) means for presetting a cutter off-set distance, (c) means for multiplying each of said projected length values by said cutter off-set distance to form product factors, (d) means for assigning a direction to said product factors in accordance with the direction of said correction factors with respect to said axes and the direction of cutter off-set distance, and (e) means for combining the product factors from said means for multiplying and the dimensions at respective points defining said predetermined path in accordance with the assigned direction of said product factors to define points of intersection of segments with respect to said axes of a path parallel to said predetermined path and spaced therefrom at said cutter off-set distance.

5. In an automatic machine tool control apparatus adapted to move a cutting tool with respect to a plurality of coordinate axes, the combination comprising:

(a) a record having recorded thereon as numerical data projected dimensions along the axes of terminal points formed by the intersections of a plurality of straight line segments defining a predetermined path of the center of the cutting tool and correction factors including projected length values along the plurality of axes of a vector from each of said terminal points to an intersection of straight line segments parallel to the segments on each side of each respective terminal point and spaced therefrom at a unit distance, (b) means for presetting an off-set numerical value corresponding to a selected perpendicular distance from said predetermined path, (c) means for converting said projected dimensions, correction factors and off-set numerical value into electrical signals in a digital code form, (d) a digital multiplier operable to scale each of said converted correction factors with said off-set value, (e) a digital algebraic adding circuit operable to combine said converted and scaled corrected factors with the converted projected dimensions to define the dimensions with respect to said axes of new terminal points of intersection of straight line segments parallel to the segments of the predetermined path and spaced therefrom by said perpendicular distance, and (f) means for interconnecting the means for converting, the multiplier and the adder to transmit said converted dimensions, correction factors and off-set value therebetween.

6. In an automatic machine tool control apparatus adapted to move a cutting tool with respect to a plurality of coordinate axes, the combination comprising:

(a) a record having recorded thereon as numerical data projected dimensions along the axes of terminal points formed by the intersections of a plurality of straight line segments defining a predetermined path of the center of the cutting tool and correction factors including projected length values and direction along the plurality of axes of a vector from each of said terminal points to an intersection of straight line segments parallel to the segments on each side of each respective terminal point and spaced therefrom at a unit distance, (b) means for presetting an off-set numerical value corresponding to a selected perpendicular distance and direction from said predetermined path, (c) means for converting said projected dimensions, correction factors and off-set numerical value into electrical signals in binary digital form, (d) a binary digital multiplier operable to scale each of said converted correction factors with said off-set value, (e) a binary digital computer circuit operable to algebraically combine said converted and scaled correction factors with the converted projected dimensions to define the dimensions with respect to said axes of new terminal points of intersection of straight line segments parallel to the segments of the predetermined path and spaced therefrom by said perpendicular distance, (f) means for presetting said computer circuit in response to the direction of said correction factors and off-set value to produce either the sum or the difference of said scaled correction factors and projected dimensions, and (g) means for interconnecting the means for converting the means for presetting, the multiplier and the computer circuit to transmit said converted dimensions, correction factors and off-set value therebetween.

References Cited

UNITED STATES PATENTS

| | | | |
|---|---|---|---|
| 3,318,195 | 5/1967 | Fitzner | 90—13.99 |
| 2,917,693 | 12/1959 | Cail | 318—20.120 |
| 3,073,998 | 1/1963 | Bower | 340—347.3 |
| 3,123,657 | 3/1964 | Clark et al. | 235—151.11 |
| 3,246,129 | 4/1966 | McKelvie | 235—151.11 |
| 3,390,315 | 6/1968 | McDonough et al. | 318—20.130 |

MARTIN P. HARTMAN, *Primary Examiner.*

U.S. Cl. X.R.

90—13.99; 318—18